US005184713A

United States Patent [19]

Nakagawa

[11] Patent Number: 5,184,713

[45] Date of Patent: Feb. 9, 1993

[54] TAKE-UP TUBE TRANSPORTING APPARATUS

[75] Inventor: Osamu Nakagawa, Kyoto, Japan

[73] Assignee: Murata Kikai Kabushiki Kaisha, Kyoto, Japan

[21] Appl. No.: 791,493

[22] Filed: Nov. 12, 1991

[30] Foreign Application Priority Data

Nov. 16, 1990 [JP] Japan .......................... 2-119898[U]
Nov. 16, 1990 [JP] Japan .......................... 2-310927

[51] Int. Cl.[5] .......................... B65G 29/00

[52] U.S. Cl. .......................... 198/465.1; 198/465.3; 198/803.12; 198/400; 242/35.5 A

[58] Field of Search .......... 198/465.1, 465.3, 803.12, 198/803.01, 487.1, 400; 242/35.5 A; 57/281, 90

[56] References Cited

U.S. PATENT DOCUMENTS 3,978,971 9/1976 Conrow et al. .................. 198/400
4,776,468 10/1988 Kiriake .................. 198/803.12 X
4,784,255 11/1988 Uchida .................. 198/465.1
4,846,618 7/1989 Matsui .................. 242/35.5 A X
4,970,856 11/1990 Taniguchi et al. ........ 242/35.5 A X
5,011,000 4/1991 Kawasaki et al. .............. 198/465.1
5,074,401 12/1991 Morita et al. .................. 198/465.1
5,092,116 3/1992 Kawasaki et al. ........... 198/465.1 X

*Primary Examiner*—Joseph S. Valenza
*Assistant Examiner*—Cheryl L. Gastineau
*Attorney, Agent, or Firm*—Spensley, Horn, Jubas & Lubitz

[57] ABSTRACT

A take-up tube transporting apparatus comprises tray transporting line which circulate endlesswise in two upper and lower stages between a winder and a preparation machine for replacing conical take-up tubes ejected from a textile machine with spinning bobbins to send the latter to the textile machine, a take-up tube mounting device for supplying the conical take-up tubes ejected from the preparation machine to empty trays which circulates along the tray transporting lines, and a take-up tubes supplying device for removing the conical take-up tubes from the take-up tube mounting trays delivered from the take-up tube supplying device to the tray transporting lines to supply the conical take-up tubes toward a winder.

5 Claims, 5 Drawing Sheets

LA
LD
T
B
T
B
1
100
101
103
101
B

LB
LC
5
LA
B
T
LD
LD

LA(LB)
201
B
202
200
201
203
203
204
T
202
205
203
202a
206a
206
B
208
207
206b

LS
S
LS
BS
310
302b
311
318
319
320
17
302
T
302a
304
303b
B
303
307
301
323
322
321
303a
305
321
308
306
312
315a
316
309
W
B
LW
LW"
322
LW'
301
313
314
315

TAKE-UP TUBE TRANSPORTING APPARATUS

BACKGROUND OF THE INVENTION

1. Field of the Invention

This invention relates to a take-up tube transporting apparatus, and particularly to a transporting apparatus for conical take-up tubes from a textile machine such as a double twister toward a winder.

2. Prior Art

In supplying conical take-up tubes discharged from a double twister to a winder, in the past, a predetermined number of conical take-up tubes discharged from the double twister are collectively placed on a carrier, which is manually carried to the winder.

The conventional carrying of conical take-up tubes from the double twister to the winder is labor-taking, and is difficult to manage or control timing or the like.

An object of this invention is to provide an apparatus capable of completely automating the carrying of take-up tubes from the double twister or the like to the winder.

For achieving the aforesaid object, this invention provides a take-up tube transporting apparatus comprising: tray transporting line which circulate endlesswise in two upper and lower stages between a winder and a preparation machine for replacing conical take-up tubes ejected from a textile machine with spinning bobbins to send the latter to said textile machine, a take-up tube mounting device for supplying the conical take-up tubes ejected from the preparation machine to empty trays which circulate along the tray transporting lines, and a take-up tube supplying device for removing the conical take-up tubes from the take-up tube mounting trays delivered from the take-up tube supplying device to the tray transporting lines to supply said conical take-up tubes toward a winder.

In the take-up tube transporting apparatus constructed as described above, in the take-up tube mounting device, the conical take-up tubes discharged from the preparation machine are supplied to the empty trays which circulate along the tray transporting lines, the trays with take-up tubes are transported to the take-up tube supplying device by the tray transporting lines, and the conical take-up tubes are removed thereat and supplied toward the stand-by winder.

On the other hand, the trays circulate along the tray transporting lines and are transported to the take-up tube mounting device.

DETAILED DESCRIPTION OF PREFERRED EMBODIMENTS

An embodiment of the take-up tube transporting apparatus according to this invention will be described hereinafter with reference to FIGS. 1 to 6.

This apparatus comprises tray transporting lines (hereinafter merely referred to as "lines") LA and LB, a take-up tube mounting device 100 and a take-up tube supplying device 200.

First, this apparatus will be briefly described with reference to FIG. 1.

A plurality of spinning frames S and the same number of automatic winders W are installed in order from the right side in the figure, and a plurality of double twisters DT and four preparation machines P are installed in order from the top on the left side in the figure.

The automatic winders W are divided into three groups. The upper winder group handles yarns of kind A, the lower winder group handles yarns of kind B, and the intermediate winder group can be used while being switched for use with the yarns of kind A or for use with the yarns of kind B, as necessary. The spinning frames S corresponding thereto are also divided into three groups.

Two lines LA and LB are passed over between the automatic winders W and the preparation machines P.

The lines LA and LB run in two upper and lower stages, the upper stage moving toward the winders W while the lower stage moving toward the preparation machines P, comprising one set of two round belts connected endless-wise as a whole.

Figure 1:
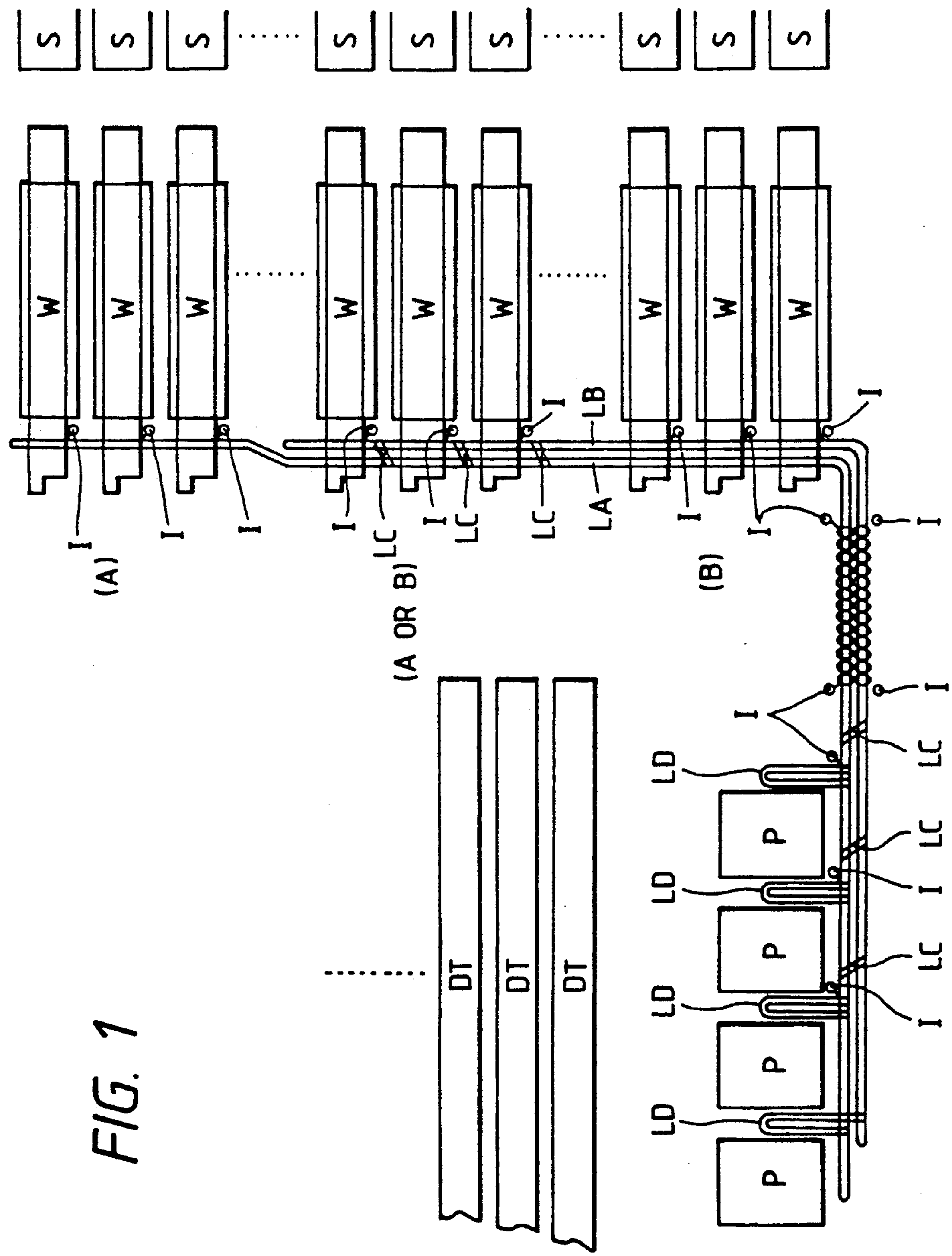
FIG. 1 shows a schematic arrangement of a take-up tube transporting apparatus according to this invention.

The preparation machine P is an apparatus which removes take-up tubes in two stages discharged out of the double twister DT from their trays and replaces them with spinning bobbins sent from the automatic winder W by a line in a separate system not shown in FIG. 1.

On the right side of each preparation machine P is provided a line LD which is connected to a line LA (the left line LD being connected to a line LB on the outlet side). In the vicinity of the bended portion of the line LD is installed a take-up tube mounting device 100 for supplying take-up tubes to empty trays which circulate along the line LA or line LB.

On the left end of each winder W is installed a take-up tube supplying device 200 which removes take-up tubes from trays with take-up tubes delivered from the take-up tube supplying device 100 to the line LA or line LB to supply them to a stand-by autodoffer.

A bypass line LC is provided between the lines of each of said intermediate winders W capable of switching the yarns of kind A to that of kind B and vice versa and each of the preparation machines P except one on the left end. The bypass line LC this side of the winder W is provided to switch a tray with a take-up tube for yarns of kind A from the line LA to the line LB as necessary to supply a take-up tube. The bypass line LC this side of the preparation machine P is provided to distribute a tray with a take-up tube discharged from the line LA to the line LB according to the kind of yarns. These switching of the lines and distribution of trays are accomplished by a movable separator described later.

Reference character I which are present in the line LA and line LB represents a receiving lever which temporarily stops a tray and then releases the tray upon demand of reception issued by the autodoffer waited for on the left side of the winder or the preparation machine P. In the embodiment as shown in FIG. 1, there are some spaces for storing trays between the winder W and the preparation machine P.

Next, the take-up tube mounting device 100 provided in the vicinity of the bended portion of the line LD on the right side of the preparation machine P will be described with reference to FIGS. 2 to 4.

The take-up tube mounting device 100 is to supply conical take-up tubes B to empty trays T which are discharged from the take-up tube supplying device 200 and circulate along the lower line LA or line LB. An example of receiving empty trays T from the line LA will be described but the same is true for the case where the empty trays are received from the line LB.

A number of empty trays T received from the line LA are lined up on the inlet side of the line LD.

Figure 3:
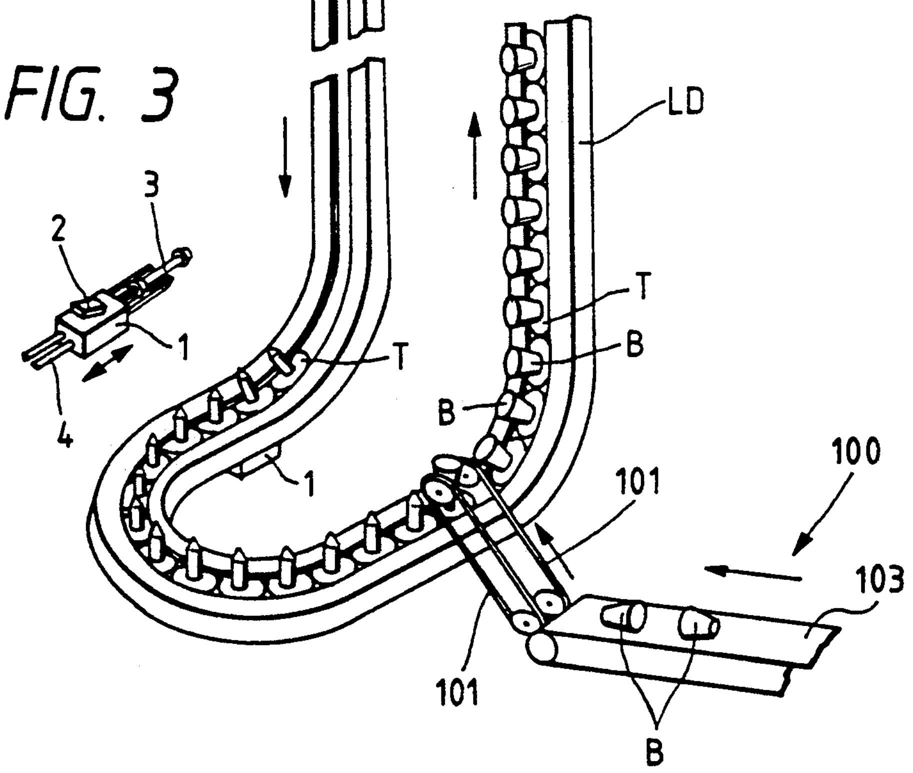
FIG. 3 is a perspective view of a feed member for moving forward trays.
Figure 4:
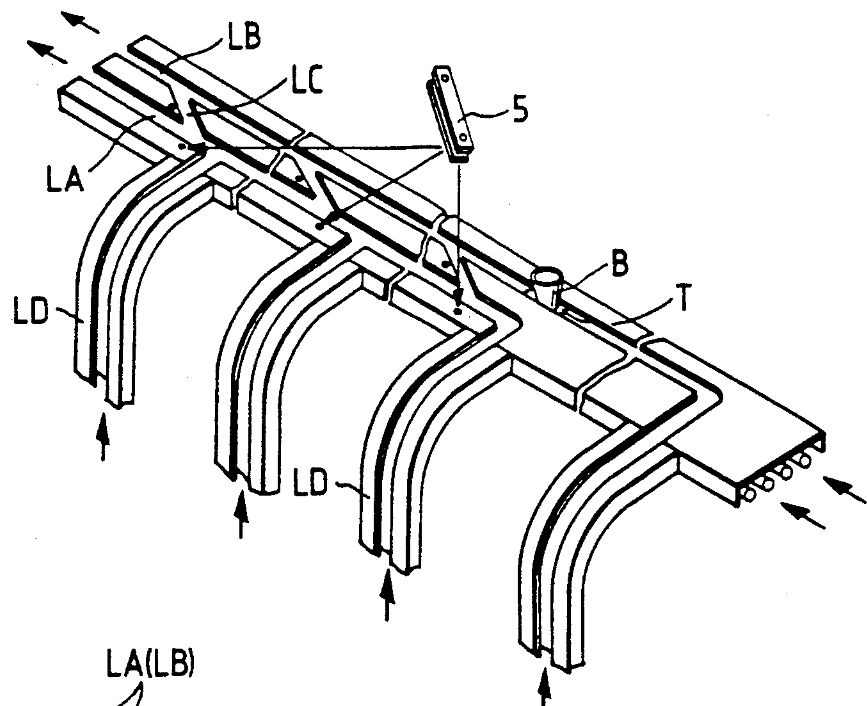
FIG. 4 is a perspective view of a mechanism for distributing trays with take-up tubes delivered from the take-up tube mounting device into two lines.

On the underside of the line LD is installed a feed member 1 which is supported slidably on a guide rod 4 and intermittently reciprocated by an air cylinder 3 or the like (see FIG. 3). The feed member 1 is provided with a feed pawl 2 so that the trays T lined up on the line LD are intermittently moved forward one by one by the reciprocating movement of the feed member 1. When the empty tray T moves to and directly below the take-up tube mounting device 100, the conical take-up tube B is supplied thereto.

This take-up tube mounting device 100 consists of two round belts 101 which run endlesswise and a belt conveyor 103 adjacent thereto which runs endlesswise.

The spacing between the two round belts 101 is set to be slightly larger than an intermediary of the size of a diameter of opposite ends of the conical take-up tube B, and the front end of the belt faces upwardly of the standby position of the tray T. A guide member such as a chute for maintaining an attitude of the take-up tube B which falls from the front end of the round belt 101 may be provided between the front end of the round belt 101 and the standby position of the tray T but this is not always required.

The belt conveyor 103 removes conical take-up tubes in two stages discharged from the double twisters DT from their trays and receives take-up tubes B sent from a stripper not shown in the preparation machine P for removing residual yarns to carry the take-up tubes B to the end of the round belt 101.

Figure 2:
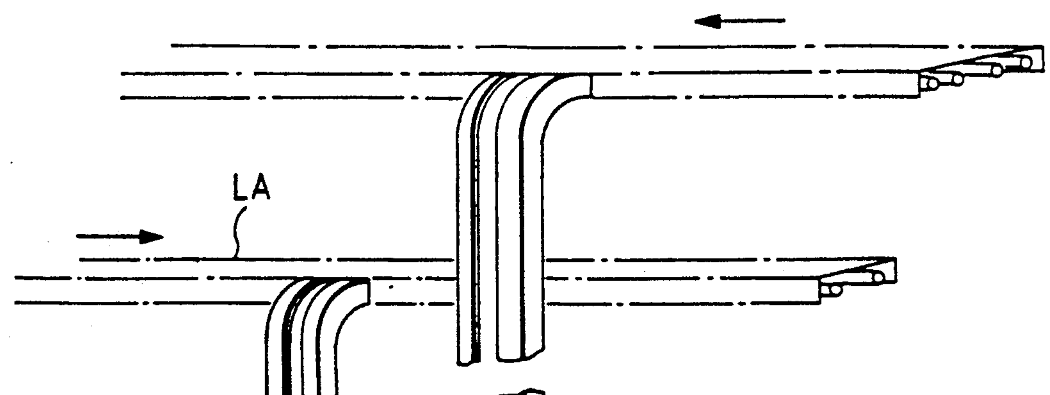
FIG. 2 is a perspective view of a take-up tube mounting device.

Some of the conical take-up tubes B which are fallen from the stripper onto the belt conveyor 103 move forward with the large diameter side ahead as shown in FIG. 2 or they move reversely. In any case, when the take-up tubes is transferred onto the two round belts 101, the take-up tube is held with the small diameter side located below between two round belts 101. The conical take-up tube B in an inverted state is carried to the standby position of the tray T while maintaining its attitude and then fallen onto the tray.

The conical take-up tube B mounted on the tray T in the inverted state moves upward along the line LD and is transferred to the upper line LA or line LB as shown in FIG. 3. This portioning-out is accomplished by a movable separator 5.

The movable separator 5 is rotatably mounted at one end thereof on the frame of the line LA by means of a shaft so that the separator 5 is manually rotated to a position at which the line LA is closed whereby the conical take-up tube B mounted on the tray T is guided from the bypass line LC to the line LB. The take-up tube from the line LD on the right end (left end in FIG. 1) is directly sent to the line LB.

Figure 5:
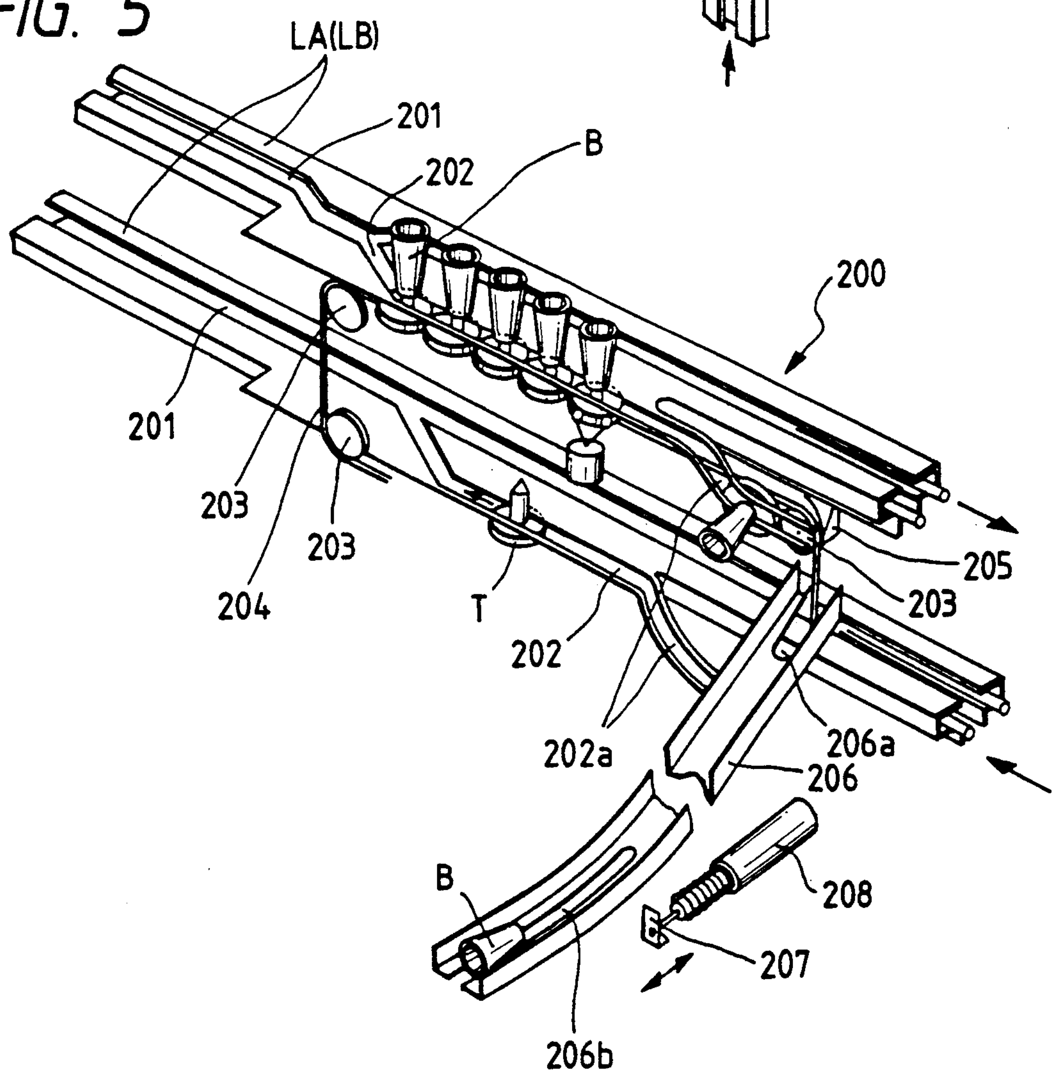
FIG. 5 is a perspective view of a take-up tube supplying device.

Next, the take-up tube supplying device 200 provided this side on the left end of each winder W will be described with reference to FIG. 5.

The take-up tube supplying device 200 removes conical take-up tubes B from trays T with take-up tubes delivered from the take-up tube supplying device 100 to the line LA or line LB to supply them to the standby autodoffer. A description will be made on the assumption that trays T with take-up tubes are sent by the line LA.

A sub-transporting path 202 is provided by the main transporting path 201 for trays T with take-up tubes in the line LA. This sub-transporting path 202 is branched from the main transporting path 201 in the upper line LA and merged into the main transporting path 201 in the lower line LA, two upper and lower bended portions *202a* being formed on the right side in FIG. 5. The surface of the sub-transporting path 202 between the upper bended portion *202a* and the lower bended portion *202a* is twisted at right angle to other portions. The sub-transporting path 202 is shown cut in FIG. 5 but actually the right portion thereof is also continuous.

A belt 204 passed over four pulleys 203 (one out of which is a drive pulley) runs along the sub-transporting path 202 whereby the trays T may be moved.

The trays T with take-up tubes which move along the main transporting path 201 of the upper line LA are informed of by a sensor that the sub-transporting path 202 is not filled with the trays T with take-up tubes whereby the trays T are received into the sub-transporting path 202. The trays T are carried by the belt 204, and when passing the bended portion *202a*, the trays T with take-up tubes are laterally directed. At this time, the conical take-up tubes B are loosely mounted on the trays T, and therefore, a clearance is formed between the conical take-up tube B and the base surface of the tray T.

On the other hand, a pawl 205 with its surface inclined downwardly is provided in the vicinity of the pulley 203 located rightward and upward, and a chute 206 for receiving take-up tubes B to deliver them to the autodoffer is provided on the underside of the pulley 203. The chute 206 is formed on opposite ends thereof with cuts *206a* and *206b*, respectively. One cut *206a* serves as a space necessary for installation of the sub-transporting path 202 while the other cut *206b* serves to actuate a feed pawl 207 which is reciprocated by an air cylinder 208 or the like.

When the tray T with a take-up tube passes the bended portion *202a* to be laterally directed and reaches a position of the pawl 205, a clearance is formed between the conical take-up tube B and the base surface of the tray T. Therefore, the pawl 205 acts on the clearance to push aside the end edge of the take-up tube B, which is then disengaged from the tray T and falls. The empty tray T from which the take-up tube B disengaged passes through the cut *206a* toward the sub-transporting path 202 and is then delivered to the lower main carrying path 201. The conical take-up tube B fallen on the chute 206 is urged by the reciprocating feed pawl 207 and moves forward toward the autodoffer. This take-up tube supplying device 200 is particularly suited for the case where less number of winding units for the winders W.

Needless to say, the take-up tube supplying device 200 can be applied to the case where take-up tubes B are supplied to devices other than the autodoffer.

Figure 6:
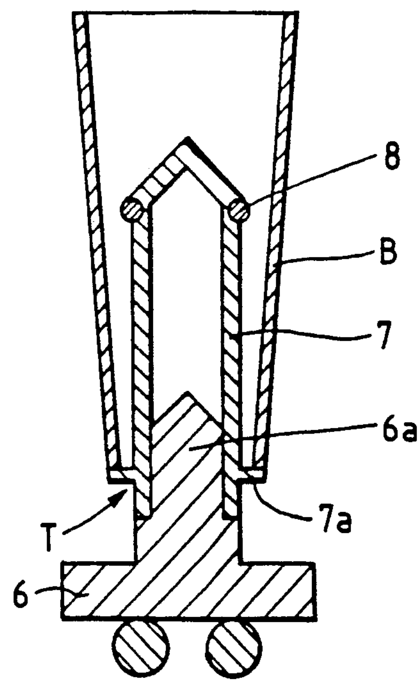
FIG. 6 is a sectional view of a tray for mounting a conical take-up tube.

Next, trays T for mounting and carrying take-up tubes B will be described with reference to FIG. 6.

This tray T mounts a conical take-up tube B in an inverted state. A cap 7 with a collar is integrally placed on a peg *6a* of a tray 6 for mounting a conventional cylindrical take-up tube.

The cap 7 is necessary to have a diameter smaller than an inside diameter of a small-diameter portion of a conical take-up tube B, and a length such that even if the tray T is laterally directed, the conical take-up tube B is not slipped out. The extreme end of the cap 7 has a conical shape so that when a conical take-up tube B falls, it can be received accurately without being caught, and the cap 7 is formed at the lower portion with a collar *7a* for receiving and supporting the small diameter portion of the conical take-up tube B. While the diameter of the collar *7a* shown is substantially coincided with the outside diameter of the small diameter portion of the conical take-up tube B, it is to be noted that said diameter of the collar can be somewhat larger or smaller than said diameter. This cap 7 can be made by integral molding using plastic.

Furthermore, an anti-slip ring 8 such as a ring rubber may be provided on the extreme end of the cap 7. This is provided to prevent the conical take-up tube B from being slipped out due to the friction with the anti-slip ring 8 when the tray T is laterally directed. However, if the cap 7 has a sufficient length, the anti-slip ring 8 is not always required. A round belt constituting a line is shown below the tray in FIG. 6.

Being this invention constructed as described above, there are effects as described below.

In the tray T constructed as described above, the conical taking-up tube B can be positively mounted without making any device about the particular control of attitude when the conical take-up tube B is fallen in the inverted state.

The tray of the present invention can be formed by fitting a cap with a collar on a peg of a conventional tray for a cylindrical take-up tube. So, the conventional tray may be used for and applied to the take-up tube transporting apparatus of the present invention.

Furthermore, according to the present invention, the conical take-up tubes which are transported in a horizontal direction are transferred onto the two round belts being held with the small diameter side thereof and are transported in a vertical direction or upward direction maintaining their attitude. The conical take-up tubes carried on the trays and transported by the transporting lines are easily and automatically disengaged from the trays and are fallen onto the chute to be supplied to the autodoffer.

That is, the carrying of the conical take-up tubes from the textile machine such as the double twister toward the winder can be completely automated without requiring any human hand, rendering management of take-up tubes very easy.

A bobbin transporting apparatus for transporting bobbins between a spinning machine and an automatic winder will be illustrated hereinafter.

Figure 8:
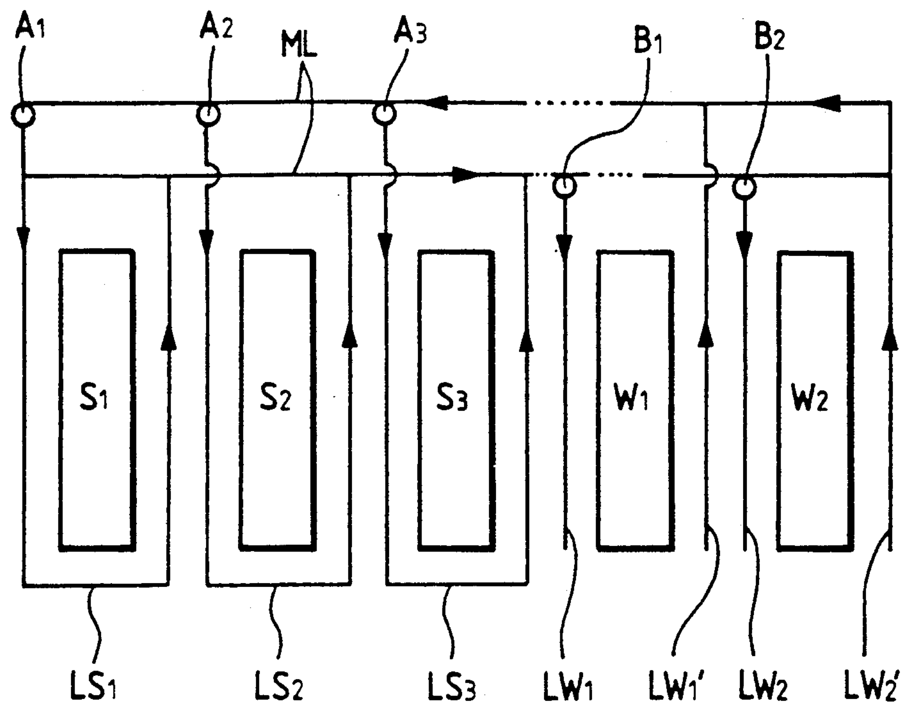
FIG. 8 shows an arrangement of a conventional bobbin conveyor.

As the apparatus for transporting spinning bobbins or empty bobbins stood upright on trays between a spinning frame and an automatic winder, apparatus as shown in FIG. 8 is known. Spinning frames $S_1$, $S_2$ . . . and winders $W_1$, $W_2$ are connected by common main carrying paths ML. The spinning frames $S_1$, $S_2$ . . . are provided with exclusive use carrying paths $LS_1$, $LS_2$ . . . , and the winders $W_1$ and $W_2$ are provided with spinning bobbin supplying paths $LW_1$ and $LW_2$ and empty bobbin return paths $LW_1'$ and $LW_2'$, which are communicated with the main carrying paths ML. Bobbin receiving portions of respective devices are provided with selectors $A_1$, $A_2$ . . . , $B_1$, $B_2$.

In the conventional art in which the carrying paths between the spinning frames and the automatic winders are in a closed loop, this apparatus is large-scaled, and the apparatus suited to the scale in connection with the number of the spinning frames and automatic winders had to be prepared.

An embodiment of this invention relates to a bobbin conveyor which can be simply installed irrespective of the number of spinning frames and automatic winders.

The present invention provides a bobbin conveyor comprising a center frame, length-adjustable side frames rotatably supported on opposite sides of said center frame, one of said side frames having a carrying path for a tray with a spinning bobbin while the other having a carrying path for a tray with an empty bobbin, and height-adjustable installing members on opposite ends thereof.

In the bobbin conveyor constructed as described above, even an installation height, an installation width and an installation spacing with respect to textile machineries such as spinning frames, automatic winders, etc. are different, it can be freely adjusted and installed.

In the installed state, transfer of spinning bobbins between the textile machineries such as spinning frames, automatic winders, etc. on opposite sides are effected through the transporting paths for trays with spinning bobbins. Similarly, transfer of empty bobbins is effected through the transporting paths for trays with empty bobbins.

Figure 7:
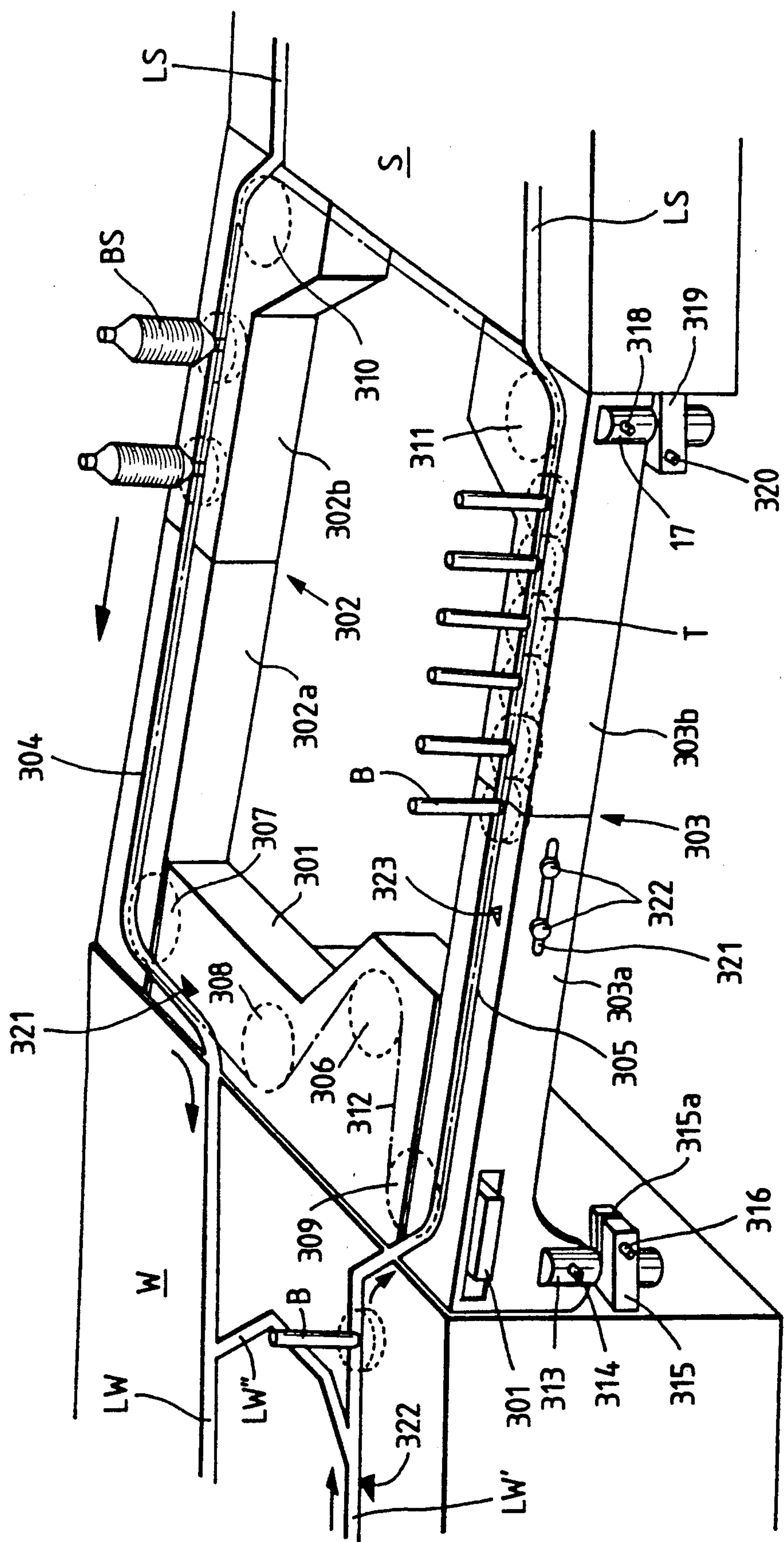
FIG. 7 is a perspective view of a bobbin conveyor according to another embodiment of this invention.

An embodiment of a bobbin conveyor according to this invention will be described with reference to FIG. 7.

This bobbin conveyor is composed of a center frame 301 and side frames 302 and 303 mounted on opposite sides thereof. The side frames 302 and 303 are mounted on the center frame 301 so that they can be rotated through a given angle by means of a shaft not shown.

A carrying path 304 and a carrying path 305 are provided on the upper surface of the side frame 302 an on the upper surface of the side frame 303, respectively.

The carrying path 304 carries trays T with spinning bobbins BS discharged from a transporting path LS of a spinning frame S to a spinning bobbin supplying path LW of an automatic winder W.

The transporting path 305 transports trays T with empty bobbins B discharged from a return path LW' of the automatic winder W to a transporting path LS of the spinning frame S.

The center frame 301 is provided with a drive pulley 306 and three driven pulleys 307, 308 and 309, the side frame 302 is provided with a driven pulley 310, and the side frame 303 is provided with a driven pulley 311. An endless round belt 312 is passed over between the pulleys 306 to 311, and is always run by a motor which drives the drive pulley 306 not shown.

The round belt 312 runs along the carrying paths 304 and 305 to carry trays T with empty bobbins B or spinning bobbins BS mounted thereon which move into the transporting path 304 or 305.

Installation of the bobbin conveyor onto the automatic winder W is accomplished by inserting a round rod 313 rotatably supported on the side frames 302 and 303 by a shaft 314 into a hole of a plate 315 secured to the automatic winder, and fastening and securing a fastening screw 316 cross a slit 315*a* in communication with said hole. The height of installation can be easily adjusted by changing a degree of insertion of the round rod 313 into the hole of the plate 315.

Installation onto the spinning frame S is also accomplished by inserting a round rod 317 rotatably supported on the side frames 302 and 303 by a shaft 318 into a hole of a plate 319 secured to the spinning frame S, and fastening and securing a fastening screw 320 cross a slit in communication with said hole. At this time, an opening condition of the side frames 302 and 303 is adjusted while adjusting the width of the spinning frame S. Even if this opening condition is changed, tension of the round belt 312 can be adjusted by moving the pulley. The adjustment of installation is similar to the side of the automatic winder W.

The side frame 303 is composed of two members 303*a* and 303*b*, the member 303*b* being slidable with respect to the member 303*a*, and the spacing between the spinning frame S and the automatic winder W is adjusted so that a screw 322 mounted on the member 303*b* can be secured to a slot 321 provided in the member 303*a*. The same is true for the side frame 302.

Black triangle marks 321 and 322 represent a position at which a stopper is installed, where a tray T with a spinning bobbin BS or a tray T with an empty bobbin B is temporarily stopped, which is released upon demand of reception. When the presence of a room for reception of a tray T with an empty bobbin B is informed of by a sensor located at a white triangle mark 323, for example, the stopper at a position at 322 is released so that the tray T with an empty bobbin B is sent to the carrying path 305. When there is no room for reception, the stopper is positioned in the direction of guiding the tray T with an empty bobbin B toward the auxiliary carrying path LW''.

Being this invention constructed as described above, there is an effect as mentioned below.

That is, the bobbin conveyor can be freely adjusted and simply installed even if there is a difference in installation height, installation width and installation spacing of the spinning frame, the automatic winder, etc. onto the textile machineries despite a simple construction and irrespective of the number of the spinning frames and automatic winders.

What is claimed is:

1. A take-up tube transporting apparatus comprising: tray transporting lines which circulate endlesswise in two upper and lower stages between a winder and a preparation machine for replacing conical take-up tubes ejected from a textile machine with spinning bobbins to send the latter to said textile machine, a take-up tube mounting device for supplying the conical take-up tubes ejected from the preparation machine to empty trays which circulate along the tray transporting lines, and a take-up tube supplying device for removing the conical take-up tubes from the take-up tube mounting trays delivered from the take-up tube supplying device to the tray transporting lines to supply said conical take-up tubes toward a winder.

2. The take-up tube transporting apparatus as claimed in claim 1, wherein said tray has a peg erected thereon, which has a diameter smaller than an inside diameter of a small-diameter portion of a conical take-up tube and a length such that the conical take-up tube is not slipped out even if the tray is laterally directed, and is provided with a collar for supporting a small diameter portion of a conical take-up tube, formed at a lower portion thereof, an extreme end of said peg having a conical shape.

3. The take-up tube transporting apparatus as claimed in claim 1, wherein said take-up tube mounting device comprises two round belts which run endlesswise, spacing between said two round belts being set to be slightly larger than an intermediary of the size of a diameter of opposite ends of the conical take-up tube, and the front end of said two round belts facing upwardly of the standby position of the tray which is circulated along the tray transporting line.

4. The take-up tube transporting apparatus as claimed in claim 3, wherein said take-up tube mounting device is installed adjacent to a belt conveyor which runs in horizontal direction, and acts to be an advancing direction inverting device for a conical take-up tube which is moved forward with the large diameter side ahead or is moved reversely on the belt conveyor.

5. The take-up tube transporting apparatus as claimed in claim 1, wherein said take-up tube supplying device comprises a sub-transporting path which is branched from a main transporting path in the upper transporting line and merged into another main transporting path in the lower transporting line, and of which surface is twisted at right angle to other portions midway between the two lines, a belt which runs along the sub-transporting path and whereby the tray may be moved, and a pawl which acts to push aside the end edge of a take-up tube carried on a tray moved to the sub-transporting path and being laterally directed, and acts to fall the take-up tube, on a chute.

* * * * *